(12) United States Patent  
Boelstler et al.

(10) Patent No.: US 7,669,794 B2
(45) Date of Patent: Mar. 2, 2010

(54) SEATBELT RETRACTOR WITH TORSION BAR

(75) Inventors: Richard Boelstler, Lake Orion, MI (US); Marc A. Jung, Lake Orion, MI (US); Kenneth Kohlndorfer, Roseville, MI (US); Richard Koning, Yale, MI (US)

(73) Assignee: Key Safety System, Inc, Sterling Heights, MI (US)

( * ) Notice: Subject to any disclaimer, the term of this patent is extended or adjusted under 35 U.S.C. 154(b) by 547 days.

(21) Appl. No.: 11/560,465

(22) Filed: Nov. 16, 2006

(65) Prior Publication Data

US 2007/0075173 A1    Apr. 5, 2007

Related U.S. Application Data

(63) Continuation-in-part of application No. 10/931,231, filed on Sep. 1, 2004, now Pat. No. 7,240,924.

(51) Int. Cl.
*B60R 22/28* (2006.01)

(52) U.S. Cl. .................................... 242/379.1

(58) Field of Classification Search ............. 242/379.1, 242/381, 396; 280/805, 807; 297/471, 472, 297/475–478
See application file for complete search history.

(56) References Cited

U.S. PATENT DOCUMENTS

| 1,335,807 | A | 4/1920 | Walker |
| 3,857,528 | A | 12/1974 | Fiala |
| 3,952,967 | A | 4/1976 | Barile et al. |
| RE29,147 | E | 3/1977 | Fiala |
| 4,323,205 | A | 4/1982 | Tsuge et al. |
| 5,558,295 | A | 9/1996 | Bauer |
| 5,607,118 | A | 3/1997 | Dybro et al. |
| 5,611,498 | A | 3/1997 | Miller, III et al. |
| 5,613,647 | A | 3/1997 | Dybro et al. |
| 5,618,006 | A | 4/1997 | Sayles |
| 5,626,306 | A | 5/1997 | Miller, III et al. |
| 5,667,161 | A | 9/1997 | Mitzkus et al. |
| 5,671,894 | A | 9/1997 | Dybro et al. |
| 5,785,269 | A * | 7/1998 | Miller et al. ............. 242/379.1 |
| 5,799,893 | A | 9/1998 | Miller, III et al. |
| 5,820,056 | A | 10/1998 | Dybro et al. |
| 5,823,570 | A | 10/1998 | Lane, Jr. et al. |
| 5,830,811 | A | 11/1998 | Tang et al. |
| 5,842,657 | A | 12/1998 | Modzelewski |

(Continued)

FOREIGN PATENT DOCUMENTS

DE       7306883       5/1973

(Continued)

*Primary Examiner*—John Q Nguyen
*Assistant Examiner*—Scott Haugland
(74) *Attorney, Agent, or Firm*—Lonnie Drayer; David King

(57) ABSTRACT

A seatbelt retractor has a spool. An energy absorption mechanism absorbs energy from the spool during seatbelt protraction. The energy absorption mechanism has at least a first portion for a relatively high rate of energy absorption and preferably a second portion for a relatively low rate of energy absorption. The seatbelt retractor has an outer sheath cast, molded, coated or otherwise bonded to and encircling a portion of the external surface of the first portion or the second portion which upon a sufficient exposure to rotational energy breaks the bond between the first portion or the second portion and the outer sheath.

19 Claims, 16 Drawing Sheets

U.S. PATENT DOCUMENTS

| | | |
|---|---|---|
| 5,899,402 A | 5/1999 | Koning |
| 5,904,371 A | 5/1999 | Koning |
| 5,924,641 A | 7/1999 | Keller et al. |
| 5,961,060 A | 10/1999 | Brambilla et al. |
| 5,967,441 A | 10/1999 | Kohlndorfer et al. |
| 6,012,667 A | 1/2000 | Clancy et al. |
| 6,206,315 B1 | 3/2001 | Wier |
| 6,228,488 B1 | 5/2001 | Tang et al. |
| 6,241,172 B1 | 6/2001 | Fugel et al. |
| 6,267,314 B1 * | 7/2001 | Singer et al. ............. 242/379.1 |
| 6,290,159 B1 | 9/2001 | Specht et al. |
| 6,312,806 B1 | 11/2001 | Tang et al. |
| 6,416,006 B1 | 7/2002 | Huber |
| 6,564,895 B1 | 5/2003 | Bohmler |
| 6,616,081 B1 * | 9/2003 | Clute et al. ............. 242/379.1 |
| 6,648,260 B2 | 11/2003 | Webber et al. |
| 6,655,626 B2 | 12/2003 | Snyder |
| 6,685,124 B2 | 2/2004 | Frank |
| 2001/0037907 A1 | 11/2001 | Peter et al. |
| 2002/0070307 A1 * | 6/2002 | Hiramatsu et al. ....... 242/379.1 |
| 2002/0092943 A1 | 7/2002 | Koning et al. |
| 2003/0132334 A1 | 7/2003 | Koning et al. |

FOREIGN PATENT DOCUMENTS

| | | |
|---|---|---|
| DE | 27 27 470 A1 | 1/1979 |
| DE | 43 31 017 A1 | 3/1995 |
| DE | 44 36 810 A1 | 4/1996 |
| DE | 195 44 918 A1 | 6/1997 |
| DE | 195 46 731 A1 | 6/1997 |
| DE | 197 27 919 A1 | 11/1998 |
| DE | 199 27 731 A1 | 12/2000 |
| DE | 199 27 427 A1 | 1/2001 |
| DE | 200 19 468 U1 | 5/2001 |
| GB | 2 371 780 A | 8/2002 |
| WO | WO 0076814 A1 * | 12/2000 |

* cited by examiner

TORSION BAR IN SINGLE LOAD RETRACTOR

2 PART TORSION BAR IN MLL RETRACTOR

SEATBELT RETRACTOR WITH TORSION BAR

RELATED APPLICATION

This patent application claims priority of and is a continuation-in-part of U.S. patent application Ser. No. 10/931,231 filed Sep. 1, 2004, entitled "Multilevel Load Limiting Retractor with Dual Shifting Mode".

TECHNICAL FIELD

This invention relates to seatbelt retractors with load limiting torsion bars.

BACKGROUND OF THE INVENTION

A seatbelt for a motor vehicle typically has a seatbelt retractor that serves to retract the belt into a housing. The belt is wound upon a spool in the housing. When the belt is drawn or protracted, the spool winds a retraction spring, which later retracts the unused portion of the belt onto the spool.

In a crash the seatbelt retractor has a lock that limits the extension of the seatbelt from the housing. The lock may be actuated by an inertial sensor, which responds to changes in vehicle speed that occur in a crash. When a large deceleration is detected, the inertial sensor triggers the lock of the seatbelt retractor to secure the seatbelt in place or prevent further extraction of the seatbelt.

In a locked condition a conventional seatbelt system restrains the vehicle occupant from moving forward during a crash. Although the seatbelt has some give, the restraining force on the vehicle occupant can be significant. To reduce this force manufacturers may use an energy absorption mechanism, such as a torsion bar, to absorb energy from the forward movement of the vehicle occupant in a controlled manner. Generally, the spool is mounted on the torsion bar, which is mechanically linked to the spool. During a crash the torsion bar twists and deforms as the seatbelt is protracted. The deformation of the torsion bar absorbs energy from the seatbelt such that the vehicle occupant is stopped more gradually, rather than suddenly, during the crash.

The weight of the vehicle occupant can affect the rate at which the vehicle occupant is slowed by the restraining force of the seatbelt and torsion bar. Heavier vehicle occupants require a greater restraining force than lighter vehicle occupants. Therefore, it is desirable to use a higher rate of energy absorption for a heavyweight vehicle occupant than for a lightweight vehicle occupant.

Recently manufacturers began producing seatbelt retractors that absorb energy at different rates to accommodate differently weighing vehicle occupants. For example, when a small person is seated in the vehicle, the seatbelt retractor is set at a low rate of energy absorption such that the lighter weighing vehicle occupant is restrained with less restraining force than a heavier vehicle occupant. On the other hand, for a heavier vehicle occupant, a higher energy absorption rate is used to slow the heavier vehicle occupant with greater restraining force. A middleweight vehicle occupant may require a combination of restraining force rates during a crash. In this way a vehicle occupant receives a restraining force that better accommodates his weight.

In some situations a vehicle experiences successive crashes. It is desirable to continue to absorb energy at the same high rate for the heavyweight vehicle occupant in a second crash. However, for a lightweight vehicle occupant, it is preferable to absorb energy from the seatbelt spool initially at a low rate for the first crash, then at the higher rate for the second crash. Moreover, for a middleweight vehicle occupant, it is desirable to absorb energy at a high rate and then a low rate for the initial crash. For the second crash, a high rate of energy absorption is preferred. Conventional seatbelt retractors do not have such a feature. A need therefore exists for a multilevel energy absorbing retractor that solves the foregoing problem.

SUMMARY OF THE INVENTION

The inventive retractor has a spool and an energy absorbing mechanism to absorb energy during a crash. The energy absorbing mechanism, a torsion bar for example, has one portion for absorbing energy at a high rate and another portion for absorbing energy at a low rate. In contrast to conventional designs the invention has a unique shift mechanism that allows the energy absorption mechanism to absorb energy at one level initially and then automatically at the other level in a second crash. In this way, for a lightweight vehicle occupant, the seatbelt retractor may be set at a low rate of energy absorption for the initial crash. Then, following this crash, the inventive seatbelt retractor shifts automatically to a high rate of energy absorption so that the seatbelt retractor continues to absorb energy for a second crash at this higher level. For a middleweight vehicle occupant, the retractor initially absorbs energy at a high rate then switches to a low rate, and, in a second crash, switches back to a high rate.

The energy absorbing mechanism may be a torsion bar having two portions: one portion absorbs energy at a high rate and the other portion absorbs energy at the low rate. The shift mechanism has a link that engages either one portion or the other to the spool. The link can be driven between a first link position in which the high rate portion is engaged and a second link position in which the low rate portion is engaged. The link may be driven by relative movement between the torsion bar and the spool, which is caused by the deformation of the torsion bar. The link itself may be a runner coupled to movement of the spool and may be received on a threaded member linked to move with the torsion bar. In this way, the seatbelt retractor automatically moves between one portion and the other portion.

The inventive seatbelt retractor may incorporate a device for intelligently switching between the high rate of energy absorption and the low rate of energy absorption. The inventive seatbelt retractor has two mechanisms for switching between energy absorption levels. This device may be a coupler that is controlled by a computer to couple either the high rate portion of the torsion bar to the spool or the low rate portion. The coupler may have a first coupling position in which the spool is engaged with the high rate portion and a second coupling position in which the low rate portion is engaged. The coupler may move between these positions in a direction generally along the axis of rotation of the spool.

The seatbelt retractor may have a default position set at the high rate of energy absorption. For a heavyweight vehicle occupant, the retractor stays at this setting throughout the course of a crash irrespective of the number of crashes. To accommodate a middleweight vehicle occupant, the energy absorbing mechanism may initially absorb energy at a relatively high rate, then, as controlled by the computer, switch to the low rate. Relative movement of the spool and the torsion bar then causes the link to move to a position for energy absorption at a high rate. For a lightweight vehicle occupant, the computer may set the seatbelt retractor immediately to a low rate of energy absorption. As the torsion bar deforms and absorbs energy at this rate, relative movement of the bar and spool automatically sets the seatbelt retractor to absorb energy at a high rate in a second crash. In this way, the inventive retractor accommodates each body weight for both a single and multiple impact crash.

In a further embodiment an outer sheath is provided which is cast, molded, coated or otherwise bonded to and encircling a portion of an external surface of the first portion of the energy absorption mechanism which upon a sufficient exposure to rotational energy breaks a bond between the first portion and the outer sheath. This feature is applicable to any seatbelt retractor having a torsion bar having at least one portion to absorb deformation and twist energy as the spool rotates. The torsion bar can for example be of single diameter one piece, a two diameter one piece, or a two diameter two piece component. The outer sheath can be any suitable diecast material like zinc, 14K gold or a zinc alloy or a molded plastic or composite material wherein the torsion bar is inserted into the outer sheath or the sheath material may be a coated material applied to the surface of a portion of the torsion bar.

The breaking of the bond between the surface of the torsion bar and the outer sheath provides an improved rapid transition from a higher energy absorption level to a lower energy absorption through the elastic-plastic deformation regions of the loaded torsion members when compared to conventional torsion bars. This rapid load change is very desirable in a crash.

DETAILED DESCRIPTION OF THE INVENTION

Figure 1:
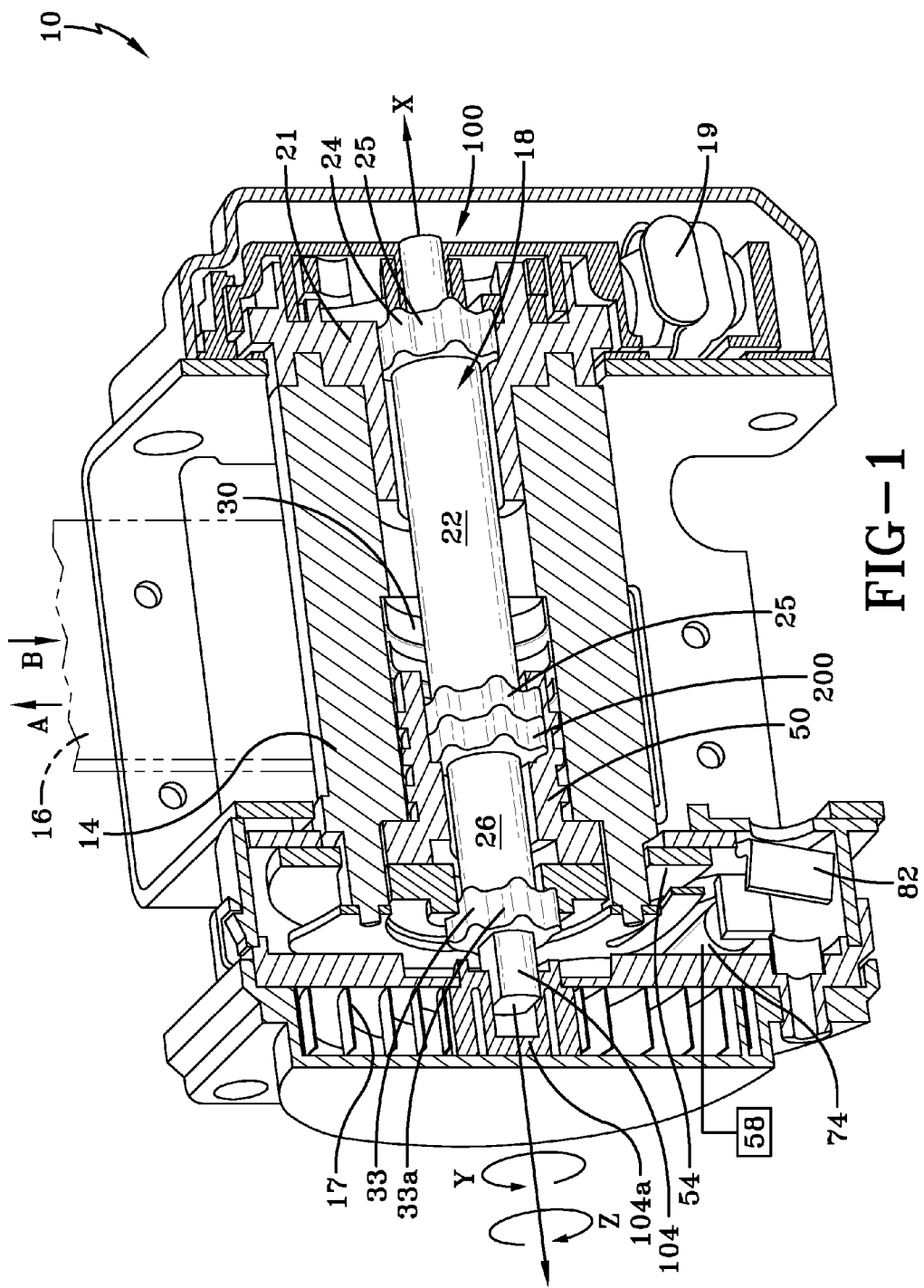
FIG. 1 is a perspective cross-sectional view of the inventive seatbelt retractor.

FIG. 1 is a perspective cross-sectional view of a seatbelt retractor 10. Like conventional seatbelt retractors, the inventive seatbelt retractor 10 has spool 14, upon which is wound a seatbelt 16. The seatbelt retractor 10 allows the belt 16 to protract in the direction of arrow A and to retract in the direction of arrow B. When the seatbelt 16 is protracted in the direction of arrow A, the spool 14 rotates in the direction of arrow Z to wind retraction a spring 17. The retraction spring 17 rewinds the unused portion of the seatbelt 16 in the direction of arrow B by rotating the spool 14 in the direction of arrow Y, which is opposite of the direction of arrow Z.

The seatbelt retractor 10 has an inertial sensor 19 that detects changes in vehicle speed. In a crash the inertial sensor 19 actuates a pawl (not shown) that engages and locks the locking wheel 21 in place to limit protraction of the seatbelt 16 in the direction of arrow A. To reduce the restraining force of the seatbelt 16 on a vehicle occupant, the seatbelt retractor 10 has an energy absorption mechanism 18, which serves to absorb energy from spool 14 as the seatbelt 16 protracts. The energy absorption mechanism 18 comprises a torsion bar mechanically linked to twist and deform with the spool 14 as explained in detail below. The energy absorption mechanism 18 has a first portion 22 and a second portion 26. The first portion 22 has a thicker diameter than the second portion 26. Both portions 22, 26 are deformable. The twisting of the first portion 22 results in the absorption of energy at a relatively higher rate than the twisting of the second portion 26, which absorbs energy at a relatively low rate.

The energy absorption mechanism 18 also acts as a support upon which the spool 14 is rotatably mounted. One end portion 100 of the energy absorption mechanism 18 has splines 24 that engage grooves (not shown) in the locking wheel 21 and is thereby rotationally locked in movement with the locking wheel 21. The other end 104 of the energy absorption mechanism 18 is rotationally locked in movement with a retraction spring 17. In addition, a threaded member 50, a torque tube, is disposed around the energy absorption mechanism 18. The threaded member 50 has grooves (not shown) that engage splines 25 of the first portion 22 of the energy absorption mechanism 18 so that the threaded member 50 is rotationally locked in movement with the first portion 22.

Figure 7:
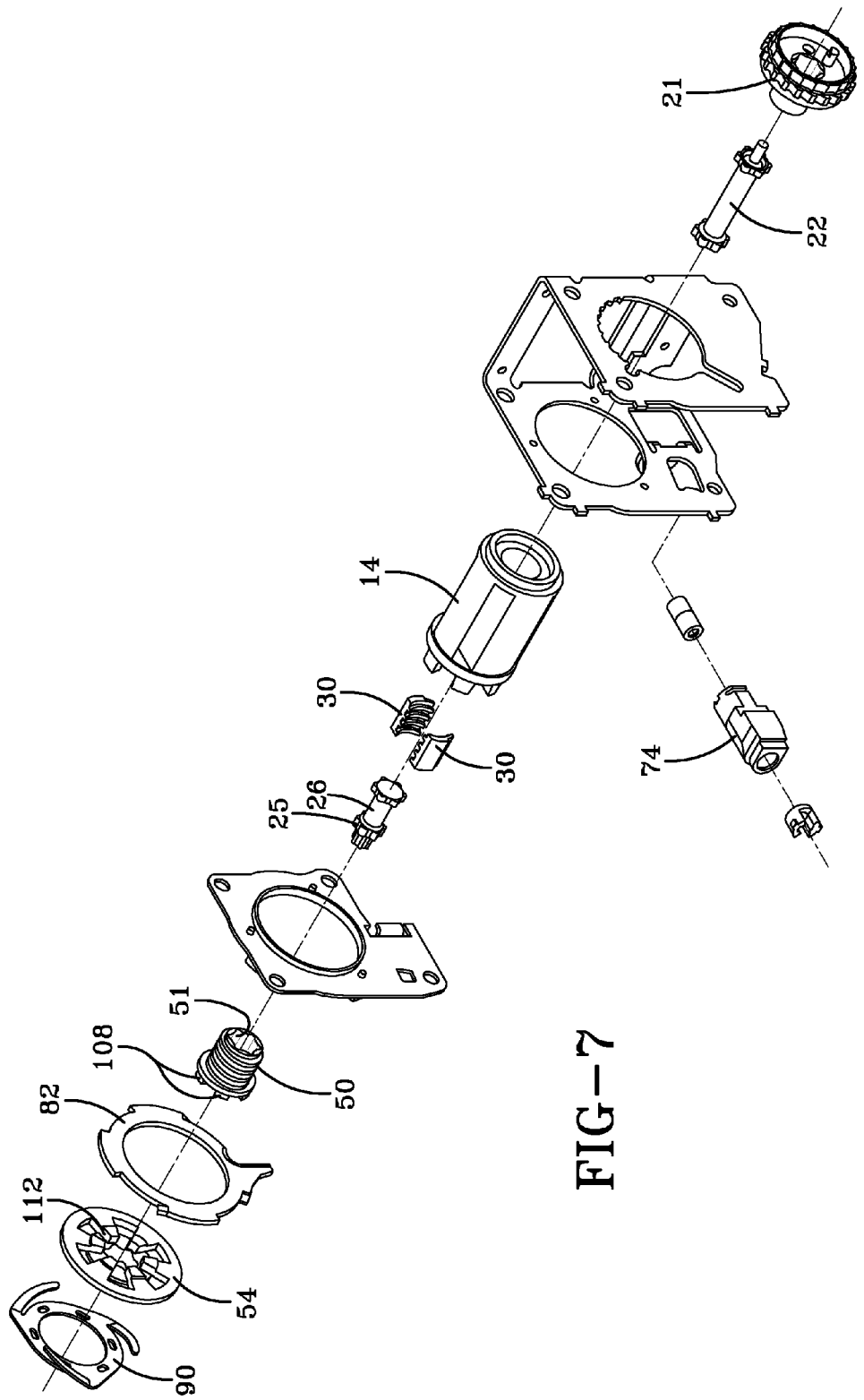
FIG. 7 is an exploded view of the inventive seatbelt retractor.
Figure 8:
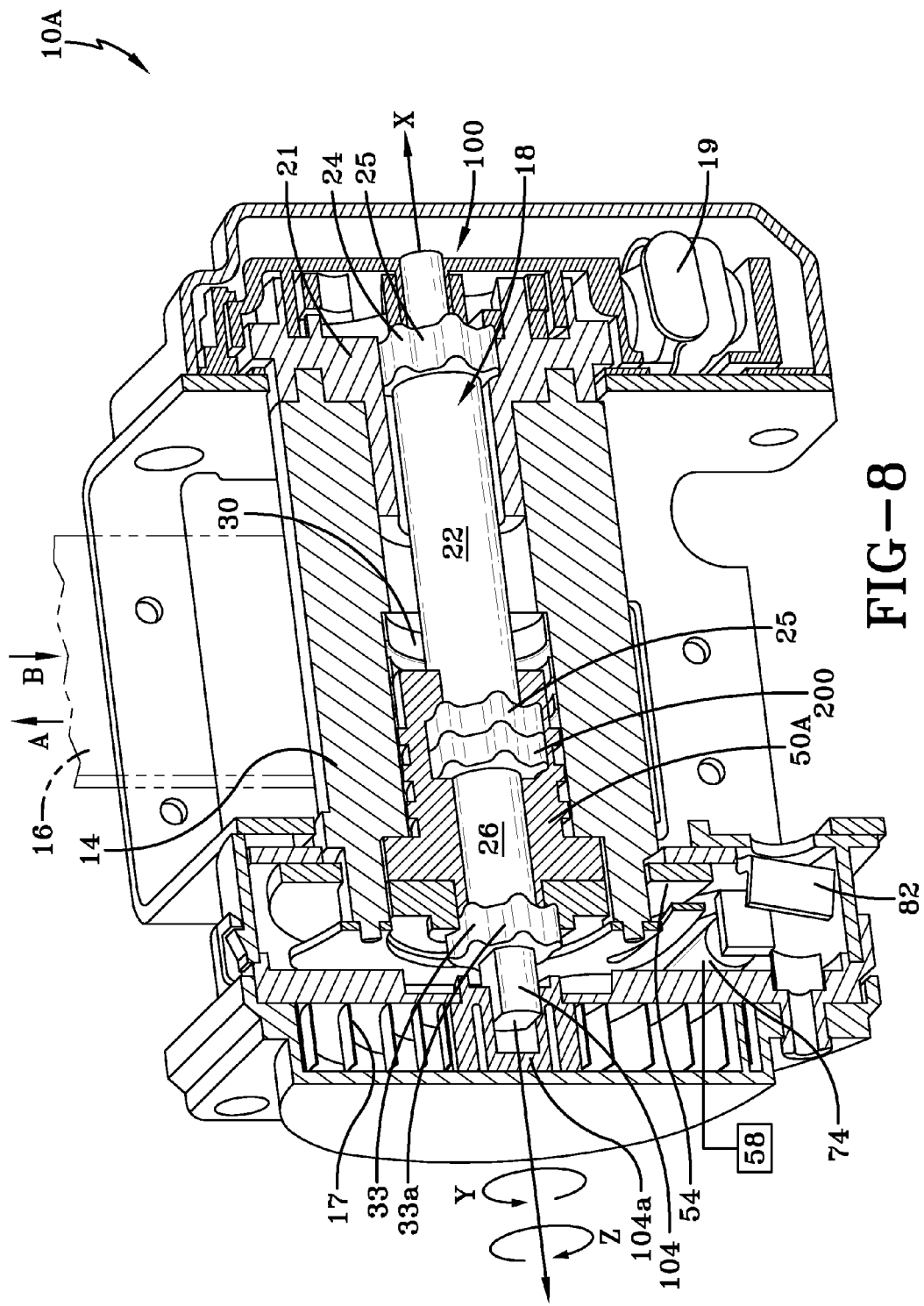
FIG. 8 is a perspective cross-sectional view of the inventive seatbelt retractor with an improved energy absorption mechanism.

The energy absorption mechanism 18 also has splines 33 located near an end portion 104 of the second portion 26. These splines 33 engage grooves (not shown) in a coupler 54 so that the second portion 26 is rotationally locked in movement with the coupler 54. As shown in FIG. 7, a threaded member 50 has raised portions 108 that engage holes 112 in the coupler 54. Preferably, the fit between the holes 112 in coupler 54 and raised portions 108 of the threaded member 50 is tighter than the fit between the splines 33 of the second portion 26 and the grooves in the coupler 54. When the coupler 54 rotates, it will rotate the first portion 22, rather than the second portion 26, when the coupler 54 is engaged with the threaded member 50 even though the second portion 26 is also engaged with the coupler 54.

Figure 2:
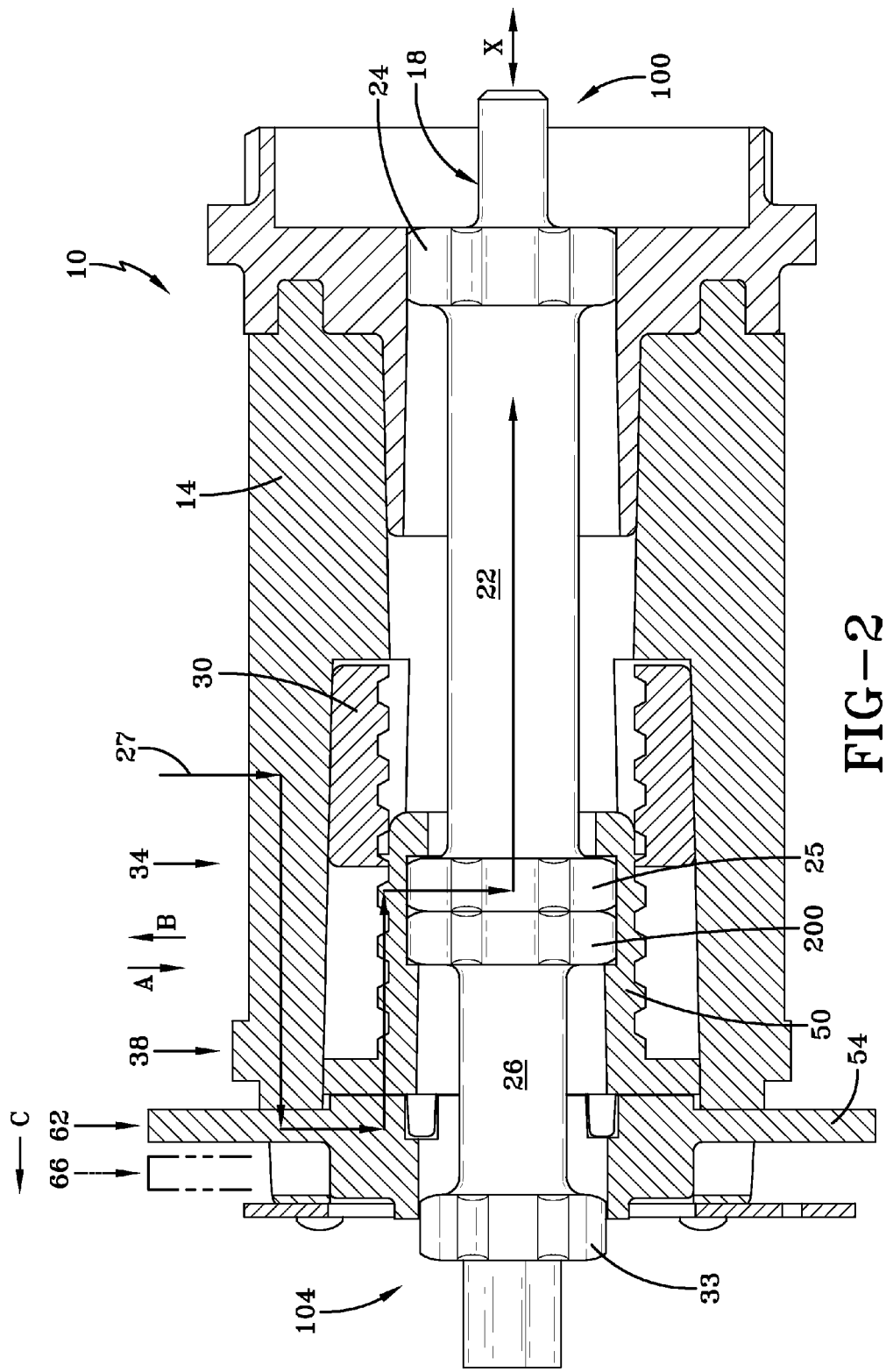
FIG. 2 is a cross-sectional view of the inventive shift mechanism of the seat belt retractor of FIG. 1, showing the energy absorption mechanism set at a high rate of energy absorption.

As shown in FIG. 2, during normal operation, the spool 14 is rotationally locked in movement with the energy absorption mechanism 18 through the coupler 54, which, at this point, is engaged with the threaded member 50. As explained above, the threaded member 50 is rotationally locked in movement with a first portion 22 of the energy absorption mechanism 18. When the locking wheel 21 is unlocked by the inertial sensor 19, rotation of the spool 14 causes the energy absorption mechanism 18 to wind or unwind the retraction spring 17.

In a crash the energy absorption mechanism 18 is selectively actuated to absorb energy from the protraction of the seatbelt 16 at two different rates: a relatively high rate through the first portion 22 and a relative low rate through the second portion 26. However, unlike conventional designs, the seatbelt retractor 10 has an additional shift mechanism 30, which also selects the rate by which the energy absorption mechanism 18 absorbs energy. In so doing, the seatbelt retractor 10 has two features that control energy absorption thereby providing an additional level of control over the seatbelt retractor 10 not found in other retractors.

The operation of the invention during a crash will now be explained. Initially, the selection of the rate of energy absorption is made by the control of the positioning of coupler 54 through control unit 58, which determines the appropriate rate by sensing the size and weight of the vehicle occupant through known sensors and programming. After the control unit 58 has made this determination, it controls the position of coupler 54 based on this sensed data.

If a heavyweight vehicle occupant is sensed, the control unit 58 maintains the seatbelt retractor 10 in the position shown in FIG. 2. Here, the coupler 54 is in a position to engage the spool 14 with the first portion 22. As explained above, when the inertial sensor 19 locks the locking wheel 21 in place during a crash, the end portion 100 of the first portion 22 is prevented from rotating. Consequently, the withdrawal of the seatbelt 16 in the direction of arrow A transmits a load along a load path 27, i.e., through the spool 14, the coupler 54, the threaded member 50, and the first portion 22. The end portion 100 is locked in place by the locking wheel 21 while, at the splines 25, the first portion 22 will continue to rotate in the direction of arrow Z. The first portion 22 will twist at the splines 25 and absorb energy by deforming. For a heavyweight vehicle occupant, the energy absorption mechanism 18 absorbs energy from the spool 14 entirely through the first portion 22 irrespective of the number of crashes. The first portion 22 should have sufficient deformability to absorb energy for the anticipated number of crash events.

Figure 3:
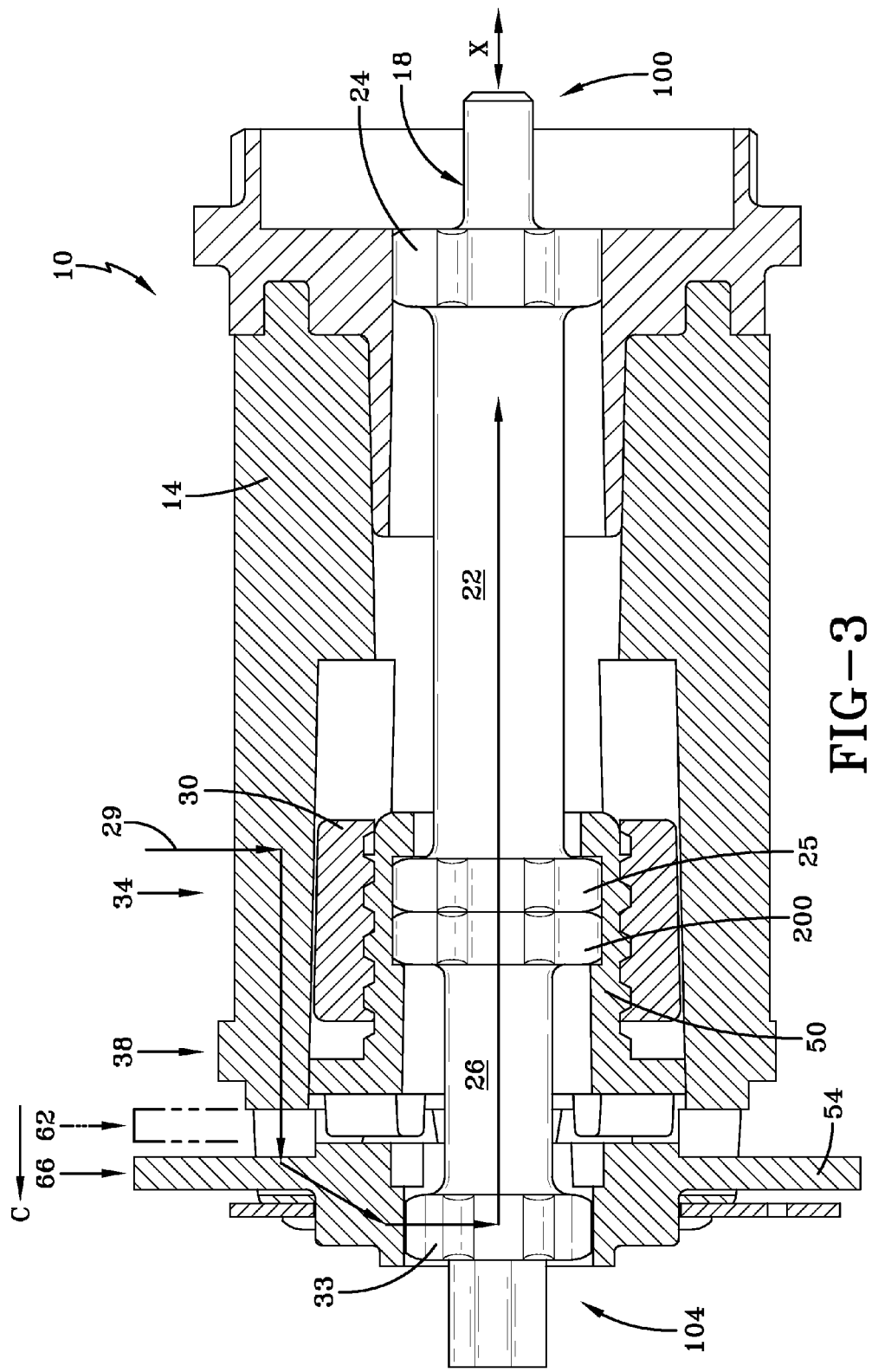
FIG. 3 is a cross-sectional view of the seatbelt retractor of FIGS. 1 and 2 with the energy absorption mechanism set at a relatively low rate of energy absorption.

If the control unit 58 determines that a moderate weight vehicle occupant occupies the seat, it is preferable to slow acceleration of the moderate weight vehicle occupant initially at a high rate than at a slow rate. Accordingly, the control unit 58 allows the spool 14 to deform the first portion 22 for a predetermined number of turns or a predetermined amount of time and then moves the coupler 54 along an axis X in the direction of arrow C from a first position 62 shown in FIG. 2 to a second position 66 shown in FIG. 3. As shown in FIG. 3 the coupler 54 is decoupled from the threaded member 50 but still remains coupled to the spool 14 at the splines 33 of the second portion 26. The load path 29 is then formed so that a load is transmitted through the spool 14, the coupler 54, and the splines 33 to a second portion 26 of the energy absorption mechanism 18. The second portion 26 is locked at the splines 200 to the threaded member 50 and thereby to the first portion 22. When the spool 14 rotates in the direction of arrow Z from seatbelt protraction, the spool 14 causes the coupler 54 to twist the second portion 26 prior to twisting the first portion 22. This has the effect of causing energy from seatbelt protraction to be absorbed at a lower rate by the second portion 26.

For a lightweight vehicle occupant, it is preferable to absorb energy from seatbelt protraction at a lower rate at the outset of the crash. As a consequence, the control unit 58 is programmed to shift the coupler 54 from a position 62 to another position 66 immediately so that the load is transmitted along the load path 29 at once as shown in FIG. 3. In this manner energy is absorbed by the seatbelt retractor 10 only at the lower rate.

Figure 5:
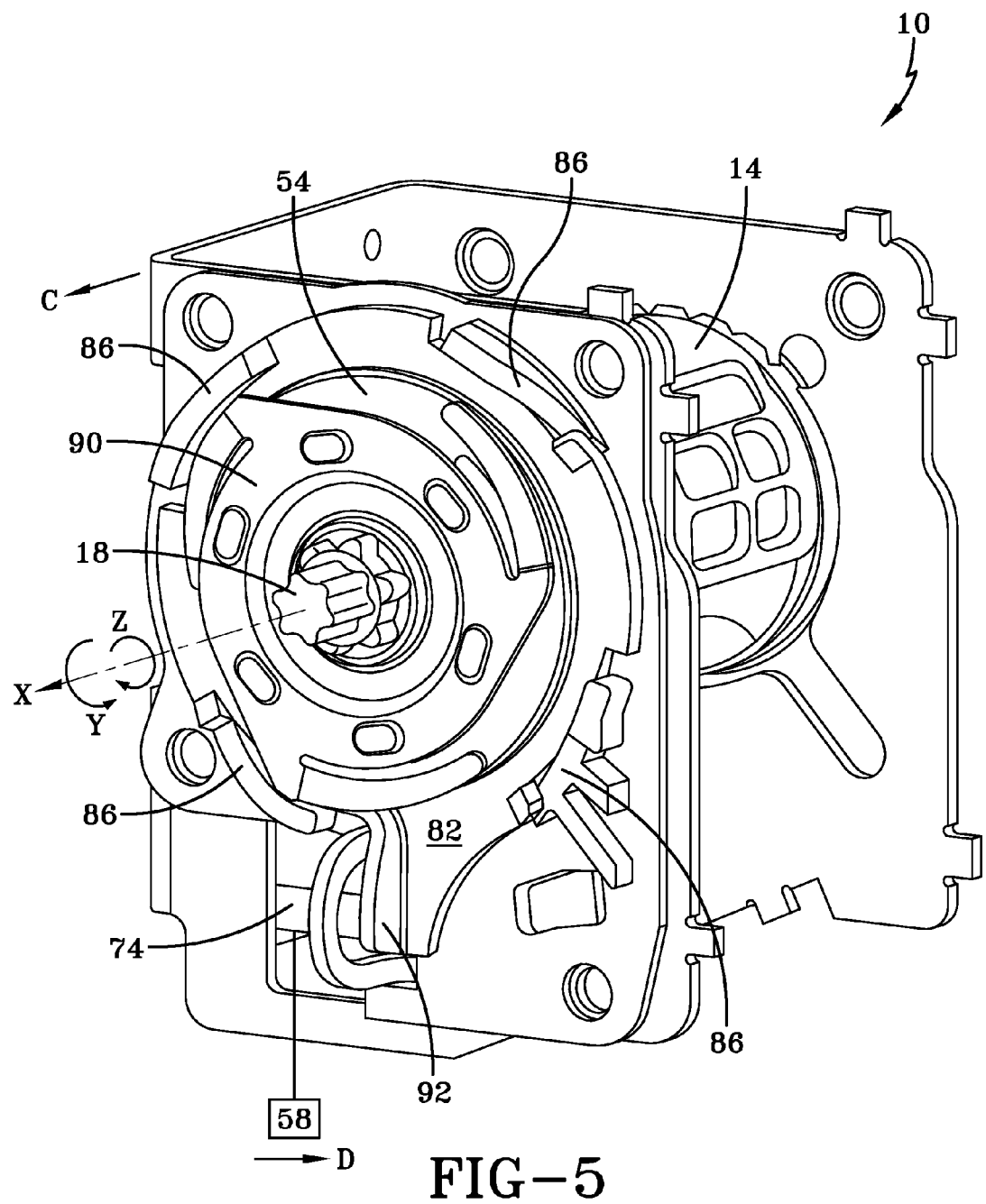
FIG. 5 is a perspective view of the inventive seatbelt retractor of FIGS. 1-4, showing the coupler in an unactuated condition.
Figure 6:
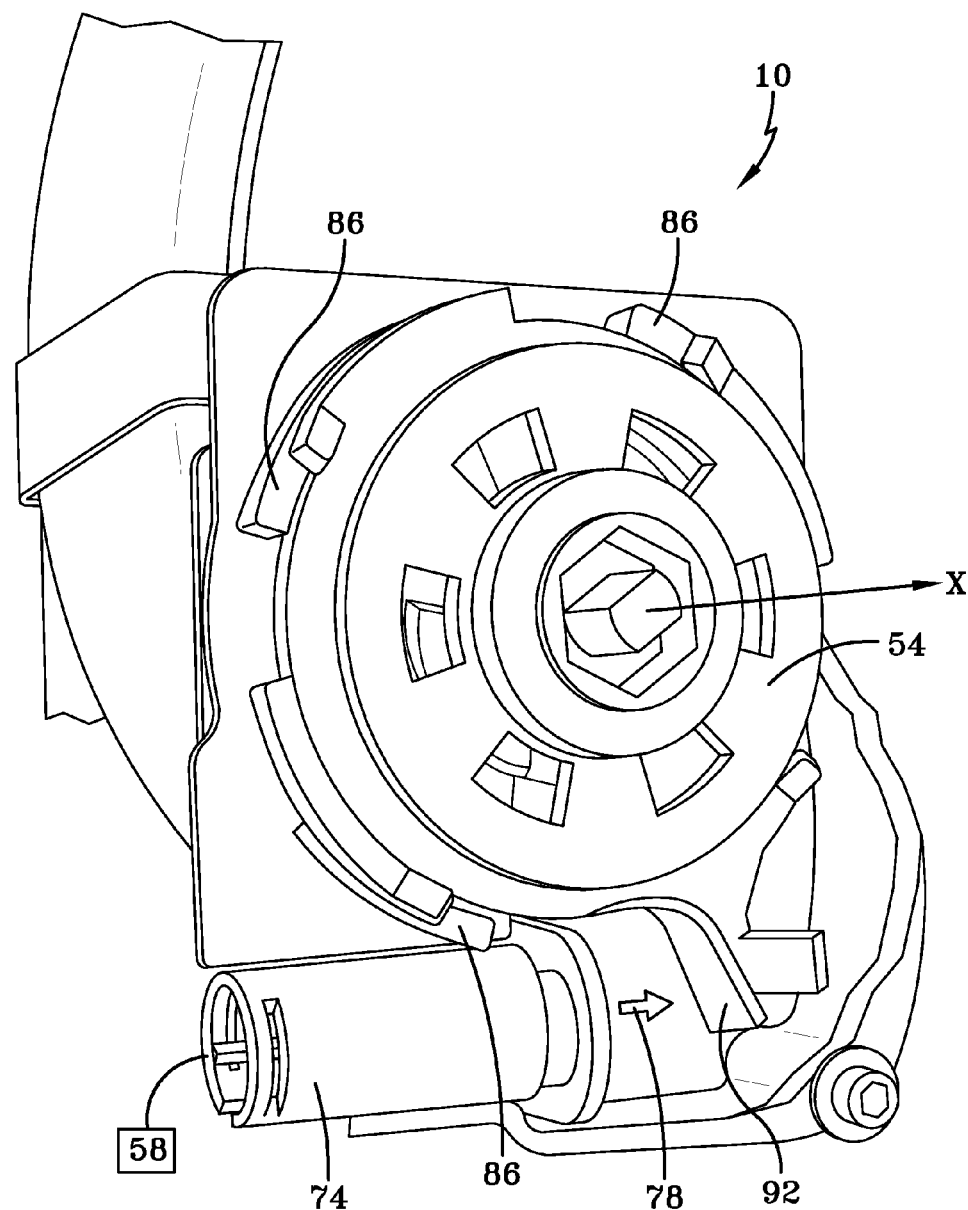
FIG. 6 shows the coupler of in an actuated condition.

The actuation of the coupler 54 will now be explained with reference to FIGS. 5 and 6. The control unit 58 is in communication with an actuator 74, a pyrotechnic device which, when actuated, generates a gas in the direction of arrow D. Arrow D is transverse to the axis X. As shown in FIG. 6, this gas creates a force 78 on a wall 92 of a member 82. The member 82 then rotates about the axis X in the direction of the arrow Y and rides up on a guide structure 86, such as ramps, causing the member 82 to move in the direction of arrow C. Movement of the member 82 causes likewise movement of the coupler 54 in the direction of arrow C. It should be noted that the member 82 will tend to slide down the guide structure 86 and separate from the coupler 54. This is desirable because otherwise the coupler 54 and consequently the spool 14 will encounter resistance when the retraction spring 17 rewinds the spool 14. If the actuator 74 is not actuated, the coupler 54 and the member 82 are otherwise biased to be at the bottom of the guide structure 86 by a retaining spring 90.

Control of the energy absorption rate by the control unit 58 is performed intelligently by known programming that analyzes the weight and size of the vehicle occupant. In addition to this approach, the seatbelt retractor 10 has a shift mechanism 30 for shifting between a first portion 22 and a second portion 26. In contrast to the control unit 58, the shift mechanism 30 shifts the seatbelt retractor 10 without reference to the weight or size of the vehicle occupant, thereby providing an added level of security to the seatbelt retractor 10.

Figure 4:
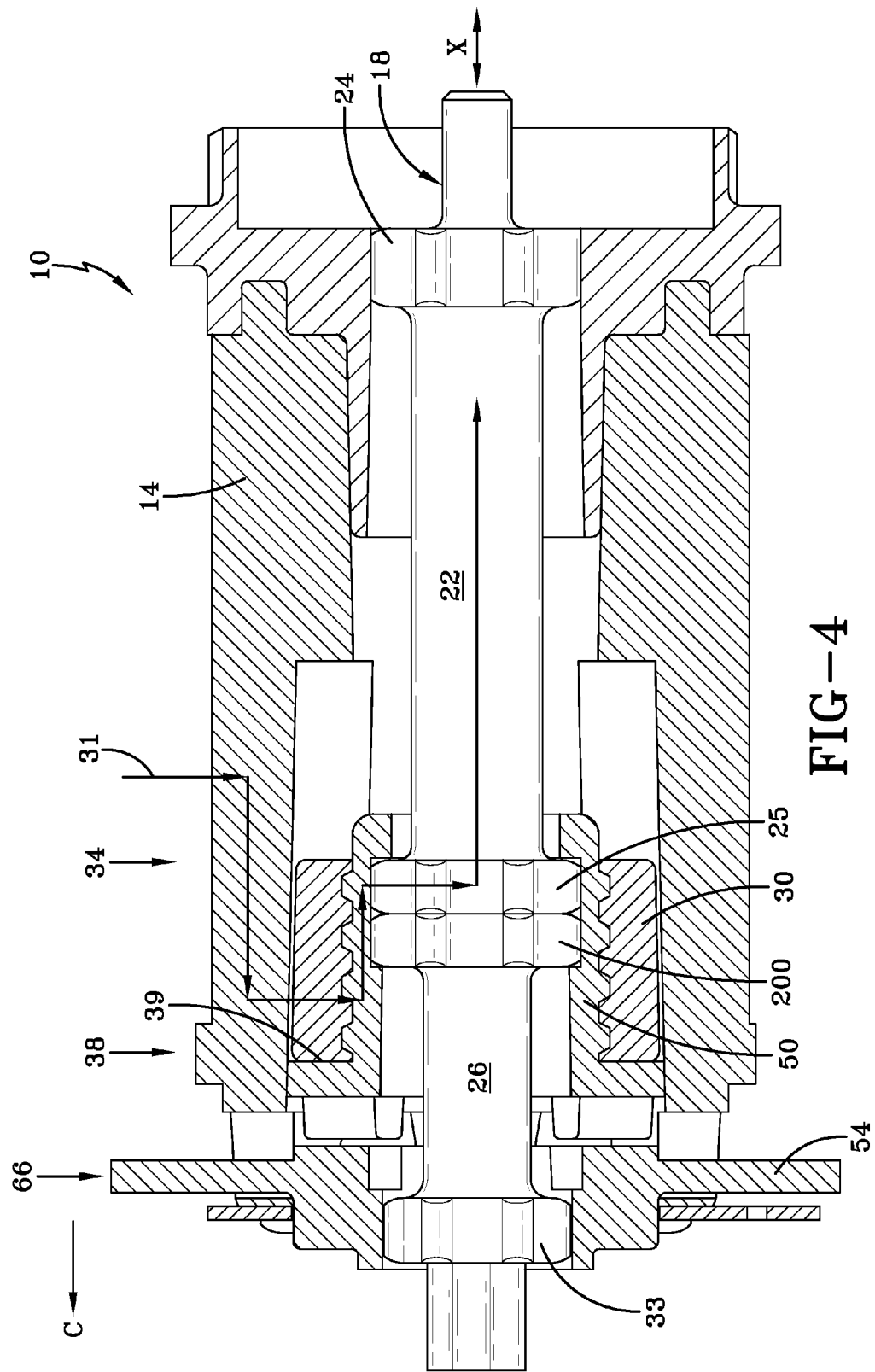
FIG. 4 is a cross-sectional view of the seatbelt retractor of FIGS. 1-3, with the shift mechanism setting the energy absorption mechanism at a high rate of energy absorption.

As mentioned previously and as shown in FIGS. 1-3, the energy absorption mechanism 18 is provided with a threaded member 50, which is linked in rotation with the first portion 22 at the splines 25. Consequently, when the energy absorption mechanism 18 rotates along the direction of arrow Z as the seatbelt 16 protracts, so too does the threaded member 50. Received on the threaded member 50 is a shift mechanism 30, in this case threaded movable links or runners (see FIG. 7). The shift mechanism 30 is linked in rotation with the spool 14 while a threaded member 50 is linked in rotation with the energy absorption mechanism 18. Because the energy absorption mechanism 18 deforms, the threaded member 50 will rotate at a slower rate than the spool 14, creating relative motion between the spool 14 and the threaded member 50. As shown in FIG. 4, this relative motion between the threaded member 50 and the spool 14 causes the shift mechanism 30 to rotate about the threads of the threaded member 50 and thereby to move in the direction of arrow C from a first link position 34 to a second link position 38. When the shift mechanism 30 has reached the second link position 38, the shift mechanism 30 will abut an end portion 39 of the threaded member 50. At this position, the shift mechanism 30 can no longer move in the direction of arrow C. As shown, the load from the seatbelt protraction will then be transmitted along a load path 31 through the spool 14, the shift mechanism 30, the threaded member 50 and a first portion 22 of energy absorption mechanism 18. Hence, the energy absorbing mechanism 18 will now absorb energy from the spool 14 at a higher energy absorbing rate than the second portion 26.

The shift mechanism 30 thereby shifts automatically and mechanically from a low rate to a high rate of energy absorption. When this shift occurs depends upon the number of turns the spool 14 is allowed to rotate before the shift mechanism 30 abuts the end portion 39. The number of turns may be based on the anticipated location of the vehicle occupant following airbag deployment. Hence, if a second crash occurs the seatbelt retractor 10 is automatically set to absorb a second impact at a high rate of energy absorption.

For a middleweight vehicle occupant, the control unit 58 allows the first portion 22 to absorb energy from the spool 14 at a high rate, then shifts the coupler 54 from the first coupling position 62 to the second coupling position 66 to allow energy to be absorbed by the second portion 26 at a low rate. Following a predetermined number of turns, the shift mechanism 30 then shifts back to the high rate of first portion 22.

For a lightweight vehicle occupant, the control unit 58 shifts immediately to a low rate of energy absorption. After a predetermined number of turns, the shift mechanism 30 then shifts to the high rate of energy absorption. In this way, both the middleweight and the lightweight vehicle occupants are protected in a second crash.

In FIGS. 8 through 14, an alternative embodiment seatbelt retractor 10A is shown. In the preferred embodiment, the seatbelt retractor 10A has all the components shown in the retractor 10 illustrated and described with respect to FIGS. 1-7 except that the threaded member 50 is replaced by an outer sheath component 50A. The outer sheath 50A as illustrated is die-cast onto the energy absorption mechanism 18. The energy absorption mechanism 18 as previously discussed has a torsion bar mechanically linked to twist and deform with the spool 14 as explained in detail below. The energy absorption mechanism 18 has a first portion 22 and a second portion 26. The first portion 22 has a larger diameter than the second portion 26—both portions 22, 26 are deformable. Consequently, the twisting of the first portion 22 results in the absorption of energy at a relatively higher rate than the twisting of the second portion 26, which absorbs energy at a relatively low rate.

As mentioned, the energy absorption mechanism 18 also acts as a support upon which the spool 14 is rotatably mounted. One end portion 100 of the energy absorption mechanism 18 has splines 25 that engage grooves (not shown) in the locking wheel 21 and is thereby rotationally locked in movement with the locking wheel 21. The other end 104 of the energy absorption mechanism 18 is rotationally coupled to a retraction spring 17. In addition, the outer sheath 50A like the threaded member 50, forms a torque tube disposed around the energy absorption mechanism 18. The outer sheath 50A as with the threaded member 50 has exterior threads. The sheath 50A will be formed with grooves (not shown) that by virtue of being cast about the splines 25 of first portion 22 of the energy absorption mechanism 18 so that the sheath 50A is rotationally locked in movement with the first portion 22.

Figure 14:
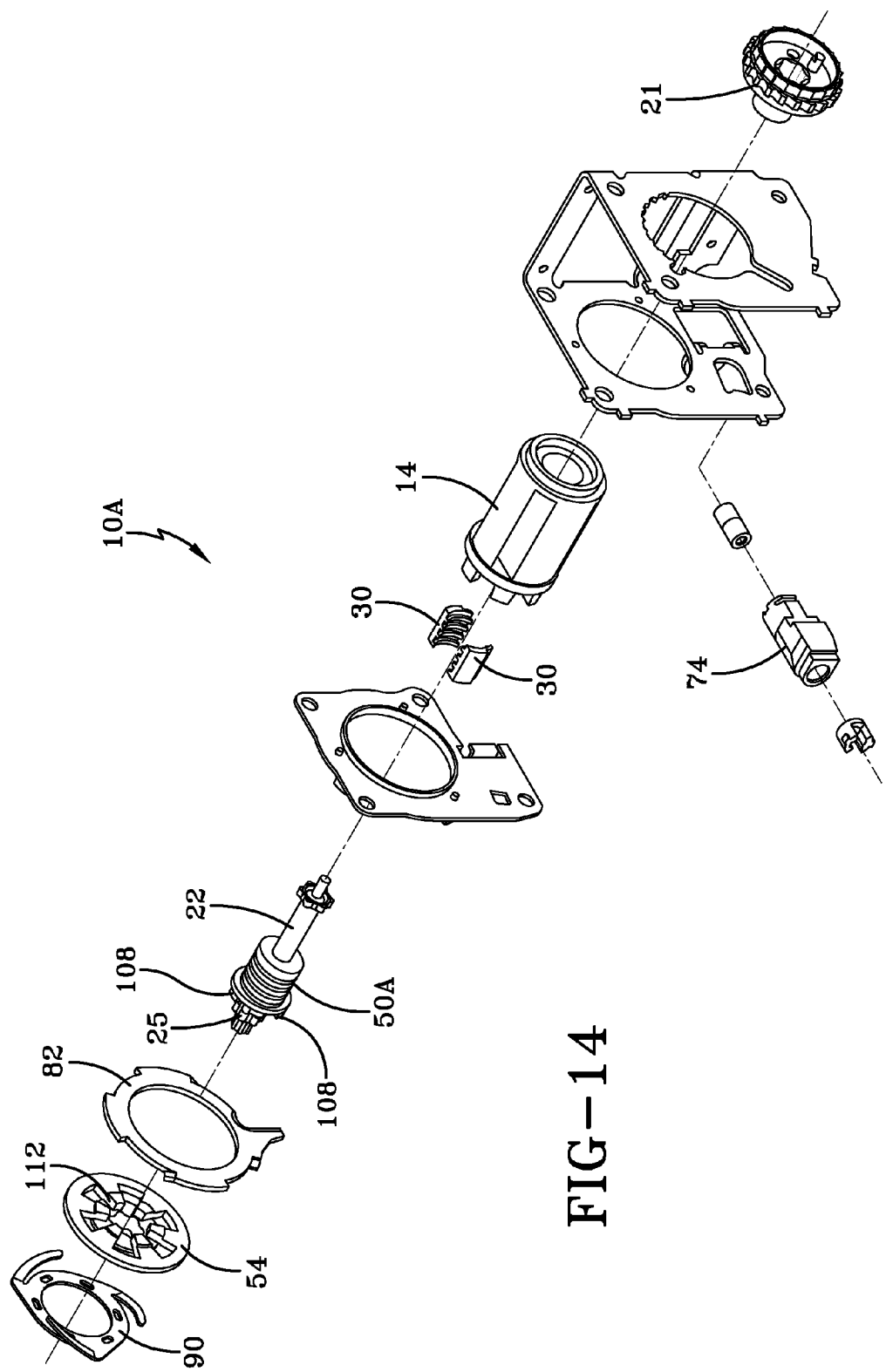
FIG. 14 is an exploded view of the inventive seatbelt retractor.

The energy absorption mechanism 18 also has splines 33 located near an end portion 104 of the second portion 26. These splines 33 engage the grooves (not shown) in the coupler 54 so that the second portion 26 is rotationally locked in movement with the coupler 54. Further, as shown in FIG. 14, the sheath 50A has raised or projecting portions 108 that engage holes 112 in coupler 54. Preferably, the fit between the holes 112 in the coupler 54 and raised portions 108 of the sheath 50A is tighter than the fit between the splines 33 of second portion 26 and the grooves in the coupler 54. Accordingly, when the coupler 54 rotates, it will rotate the first portion 22, rather than the second portion 26, when the coupler 54 is engaged with the sheath 50A even though the second portion 26 is also engaged with the coupler 54.

Figure 9:
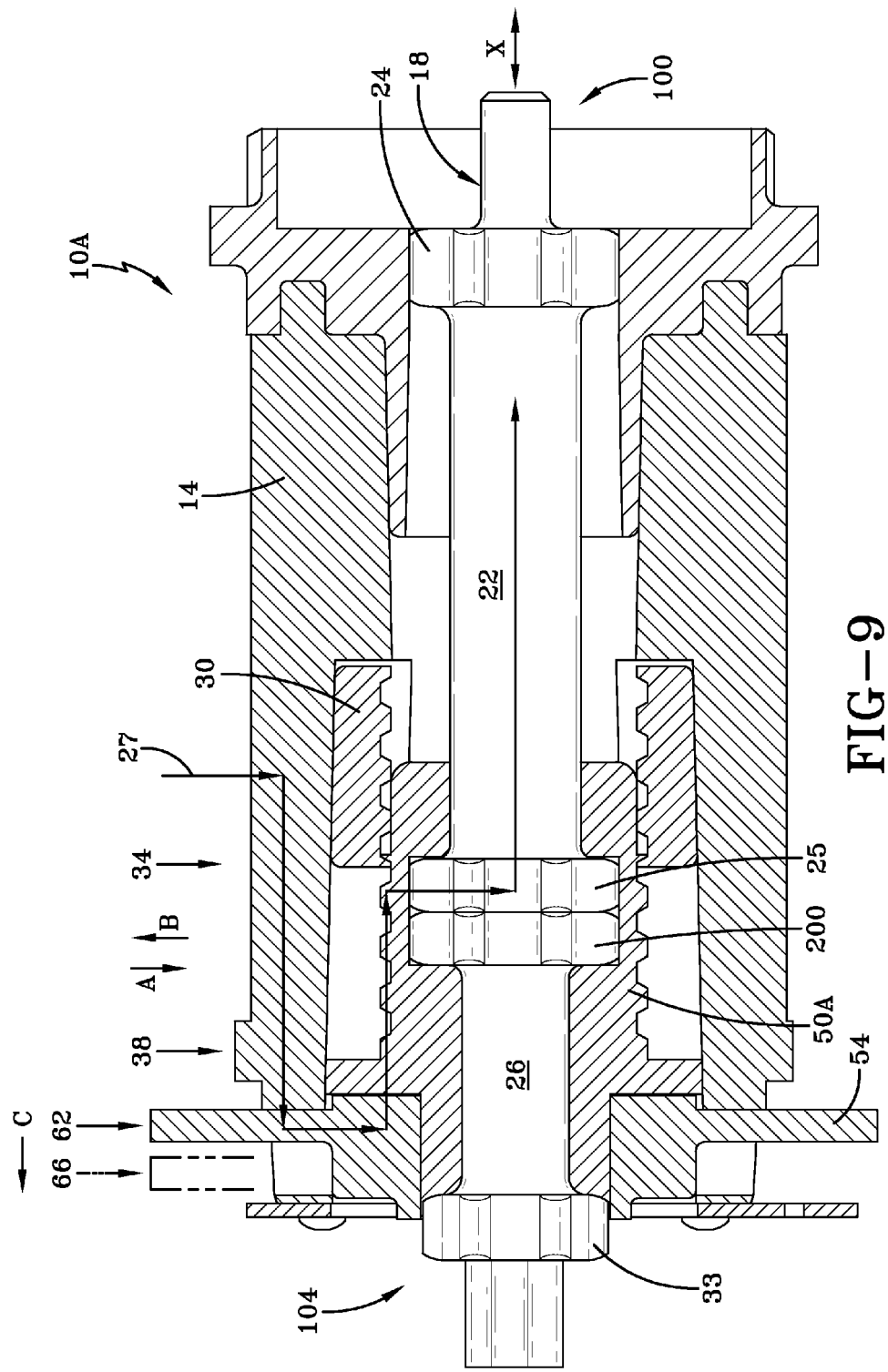
FIG. 9 is a cross-sectional view of the shift mechanism of FIG. 8, showing the energy absorption mechanism set at a high rate of energy absorption.
Figure 10:
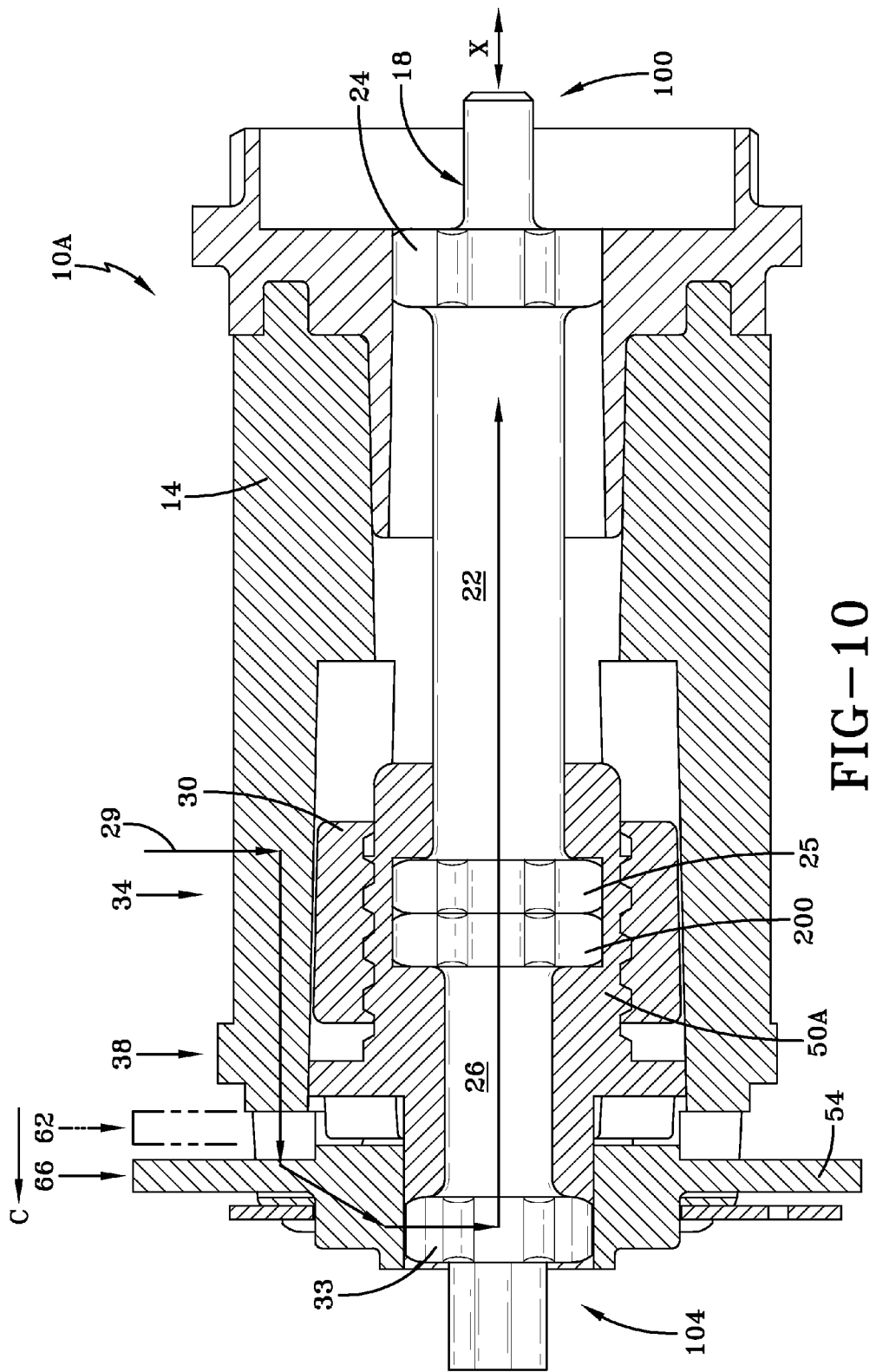
FIG. 10 illustrates seatbelt retractor of FIGS. 8-9 with the energy absorption mechanism set at a relatively low rate of energy absorption.
Figure 11:
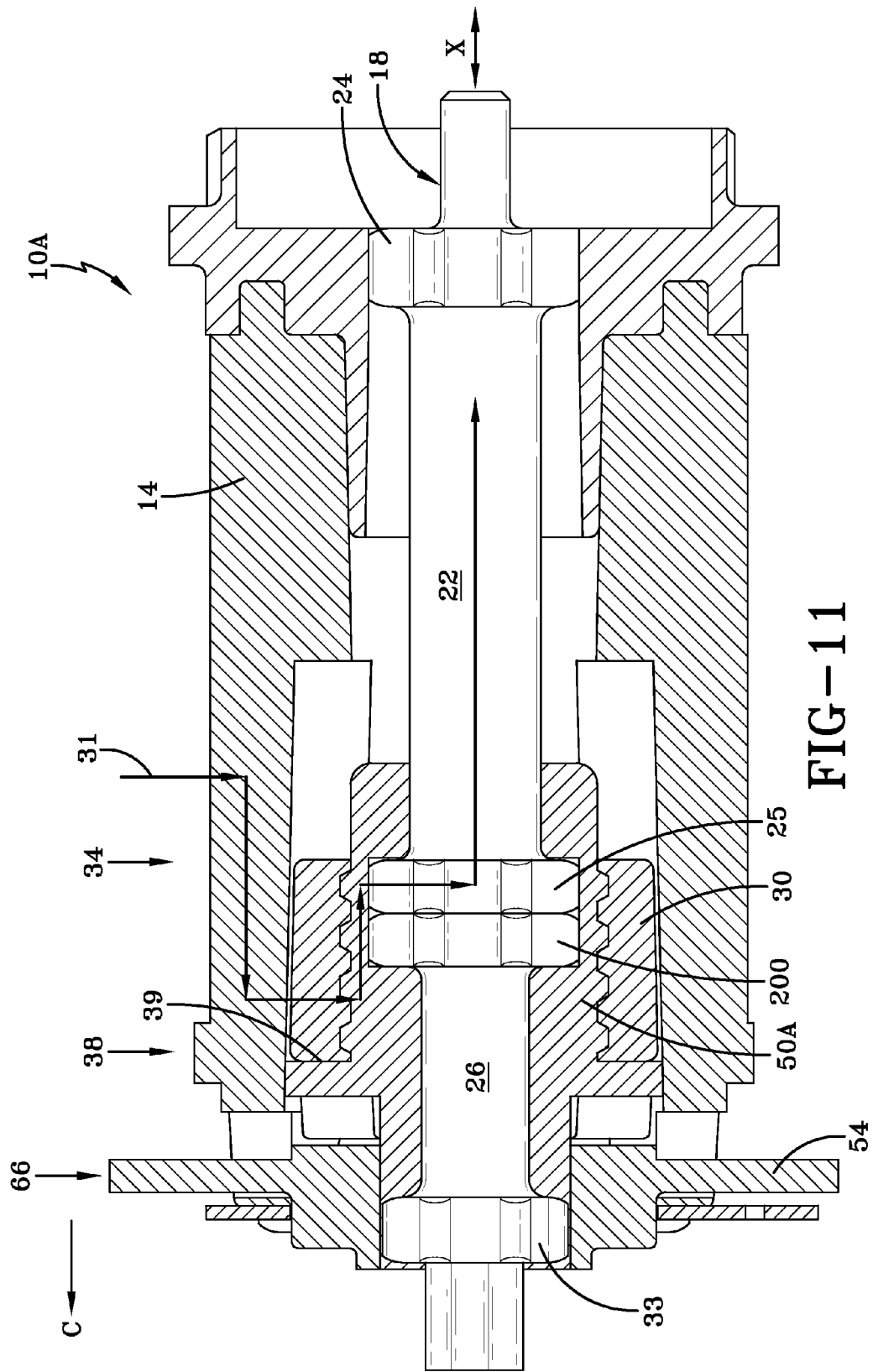
FIG. 11 is a cross-sectional view of the seatbelt retractor of FIGS. 8 and 9 with the shift mechanism setting the energy absorption mechanism at a high rate of energy absorption.
Figure 12:
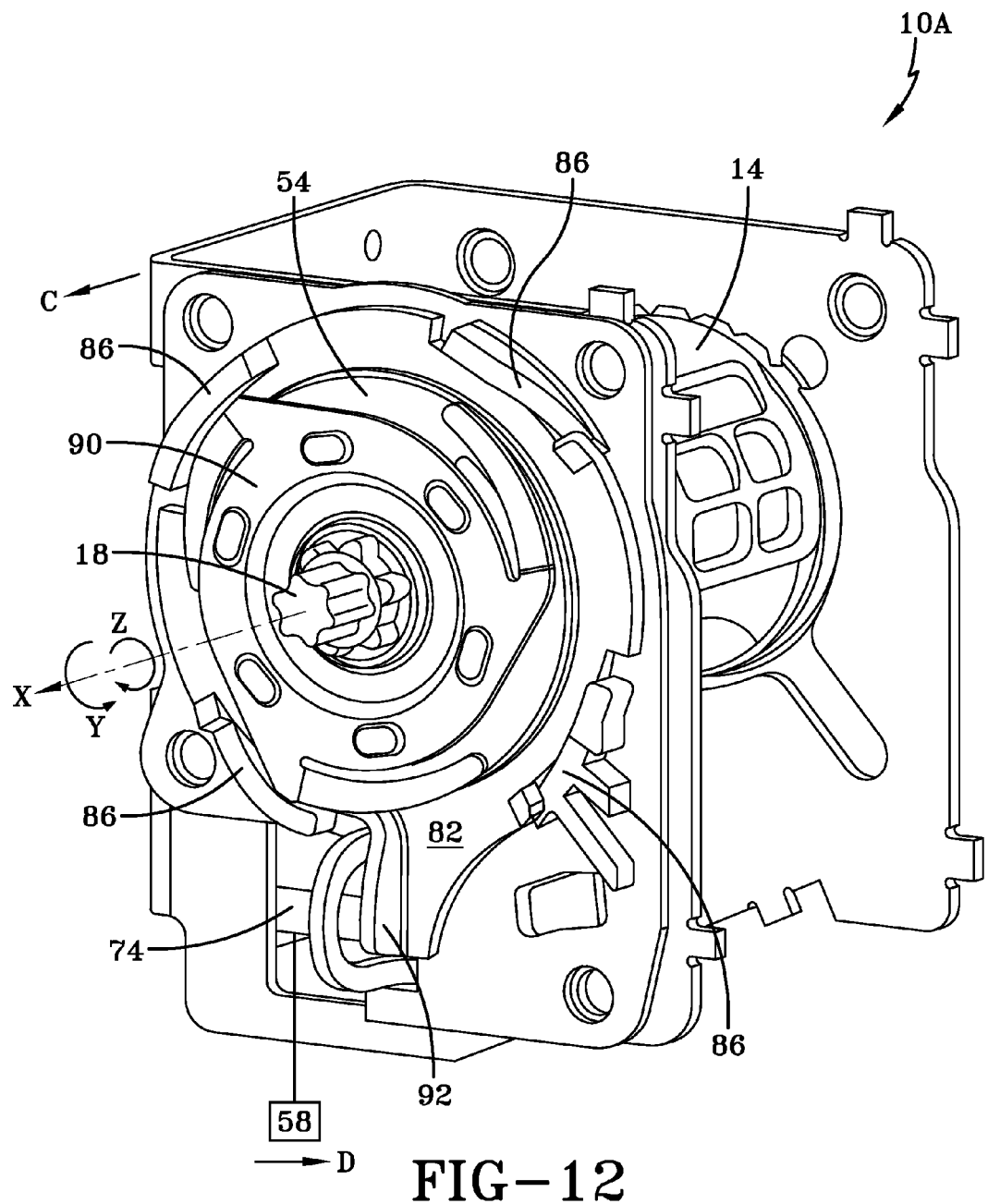
FIG. 12 is a perspective view of the inventive seatbelt retractor of FIGS. 8-11 showing the coupler in an unactuated condition.
Figure 13:
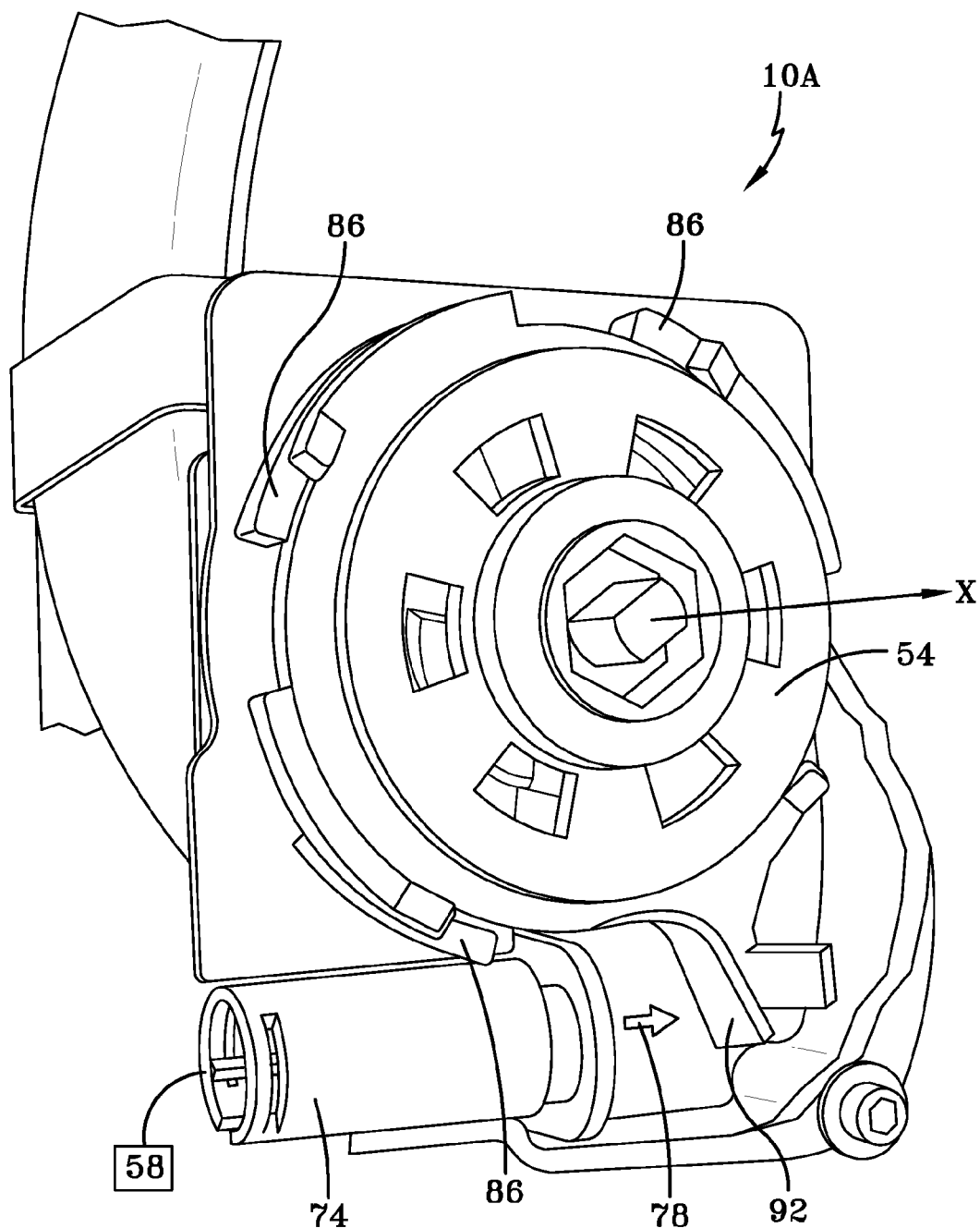
FIG. 13 shows the coupler of FIG. 12 in an actuated condition.

As shown in FIG. 9, during normal operation the spool 14 is rotationally locked in movement with the energy absorption mechanism 18 through the coupler 54, which, at this point, is engaged with the sheath 50A. As explained above, the sheath 50A is rotationally locked in movement with the first portion 22 of the energy absorption mechanism 18. When the locking wheel 21 is unlocked by the inertial sensor 19 rotation of the spool 14 causes the energy absorption mechanism 18 to wind or unwind the retraction spring 17.

In a crash the energy absorption mechanism 18 is selectively actuated to absorb energy from the protraction of the seatbelt 16 at two different rates: a relatively high rate through the first portion 22 and a relative low rate through the second portion 26. However, unlike conventional designs, the seatbelt retractor 10A has an additional shift mechanism 30, which also selects the rate at which the energy absorption mechanism 18 absorbs energy. The seatbelt retractor 10A has two features that control energy absorption thereby providing an additional level of control over the seatbelt retractor 10A not found in other seatbelt retractors.

The operation of the seatbelt retractor 10A is precisely the same as previously described and illustrated with respect to FIGS. 1-7, with the exception of the threaded member 50 was mechanically crimped onto the energy absorption mechanism 18 whereas the outer sheath 50A as shown was die-cast onto the energy absorption mechanism. Accordingly the retractor 10A with the outer sheath 50A shown in FIGS. 8-14 functions exactly like the retractor 10 with the crimped on mechanically attached threaded member 50 with a noted and particularly useful exception that improved the performance characteristics.

Figure 16A:
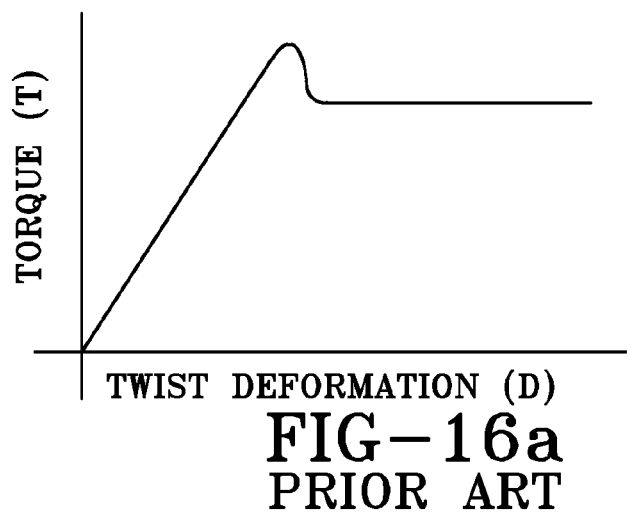
FIG. 16a is a graph showing the energy absorption rates as a function of twist deformation of the torsion bar and torque of a conventional prior art seatbelt retractor having a torsion bar single diameter.
Figure 16B:
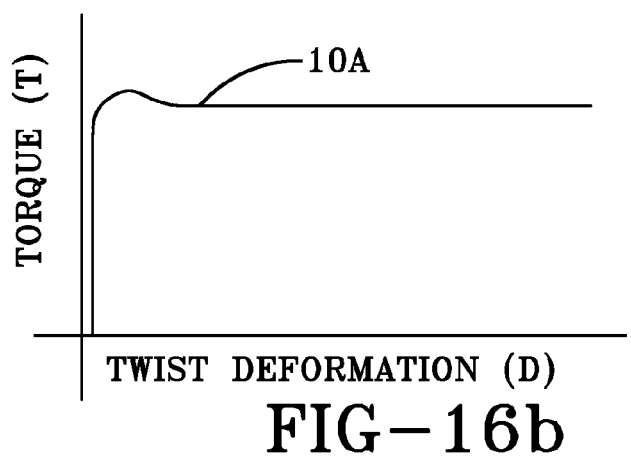
FIG. 16b is a graph showing the energy absorption rates as a function of twist deformation of the torsion bar and torque of the improved outer sheath applied on a torsion bar of a single diameter.
Figure 16C:
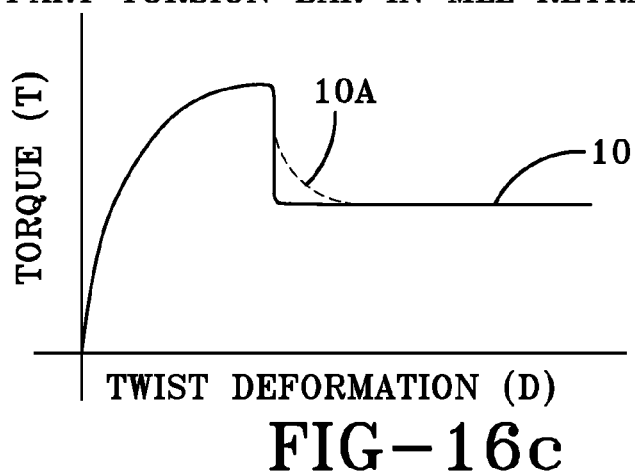
FIG. 16c is a graph showing the energy absorption rates as a function of twist deformation of the torsion bar and torque of the seatbelt retractor having a multi load level energy absorption torsion bar as shown in FIGS. 1-7 having the transition from high energy load rate to low energy absorption rate in a dashed line with the improved outer sheath bonded to a two piece torsion bar as shown in FIGS. 8-14 shown in solid lines.

As shown the outer sheath 50A is a die-cast part formed directly onto the torsion bars 22, 26. The torsion bars 22, 26 are made of steel alloyed and formed to twist multiple times before yielding or breaking. The outer sheath 50A as shown is made of zinc that at the underlying surface interfaces with the steel torsion bar 22, 26 created a bond capable of resisting a twisting torque up to a point. Beyond this threshold torque the bond quickly and uniformly breaks along its weakest attachment location. For example in the torsion bar 26 of a smaller diameter as the torque is applied and a load is transmitted to the second portion 26 the outer sheath 50A continues to transfer the torque to the larger diameter portion 22. Accordingly the load absorption rate will be at the high rate until the bond along the shaft of the portion 26 fails at the interface. The bond of the outer sheath 50A fails and lets go quickly and uniformly as a function of the circumferential area bonded along the smaller diameter shaft of portion 26 thereafter the retractor drops almost instantaneously to low rate of energy absorption from the pre bond breaking higher rate. This subtle change means the seatbelt payout load transitions from a high load rate to a low load rate more quickly than by the prior mechanical grip method. This is illustrated in the graph of FIG. 16c.

Figure 15A:
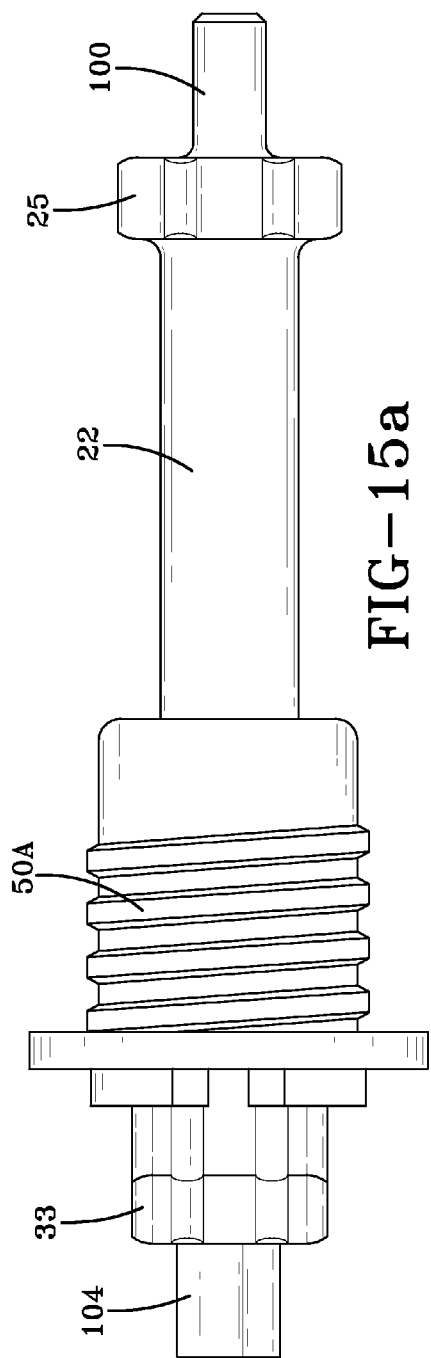
FIG. 15a is a plan view of an improved energy absorption mechanism wherein the torsion bar is a single torsion bar diameter with an outer sheath bonded to a portion of the external surface of the torsion bar.
Figure 15B:
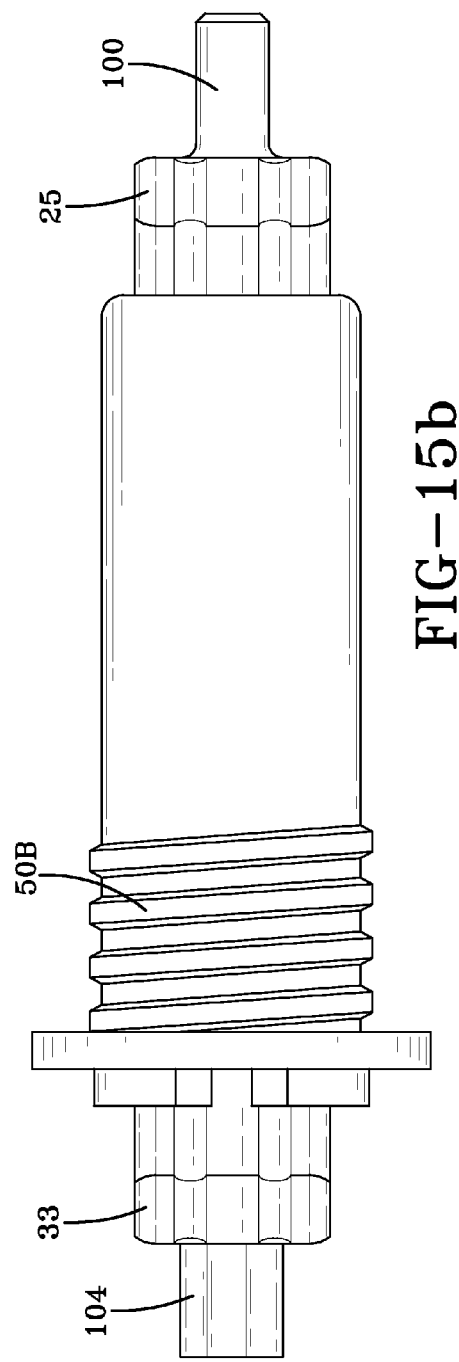
FIG. 15b is a plan view of a torsion bar similar to FIG. 15a wherein the outer sheath extends covering the entire external surface of the torsion bar.

The concept of using a die-cast outer sheath 50A can be used on a single torsion bar of a uniform diameter as shown in FIG. 15a and 15b. In FIG. 15a the outer sheath covers a portion of the torsion bar twist shaft whereas in FIG. 15b the outer sheath is shown extending across the entire length of the twist shaft of the torsion bar. This enables the grip or bond to be maximized for any given diameter torsion bar shaft.

In a one piece torsion bar shown having two portions one large diameter shaft portion 22 and a second smaller diameter shaft portion 26 as previously discussed the outer sheath 50A can be used.

The outer sheath 50A can be applied on the torsion bars as a coating, molded onto the underlying torsion bars or cast onto the torsion bars. The primary criteria is that a bond is created at the surface interface that can withstand a torque or load higher than at least a portion of the underlying torsion bar as the torsion bar twists it elongates and the diameter narrows such that when the torque twist reaches and therefore starts to exceed the strength of the bond at least a portion of the bond breaks such that the rate of energy absorptions drop quickly making a more rapid transition to the desired rate of energy absorption. For a single diameter shaft torsion bar the outer sheath 50A breaks the bond across the entire surface interface with the outer sheath 50A and the underlying torsion bar. The coating, casting, or molded outer sheath 50A must be sufficiently strong to insure it transfers the loads to break the bond surface are in its entirety on the torsion bar wherein the energy absorption load to be absorbed. This insures the transfer of load rates is virtually instantaneous in a crash.

The die-cast outer sheath 50A was made of zinc, but could alternatively be made of any zinc alloy or suitable die-cast material. The die-cast outer sheath 50 could alternatively be insert molded into a plastic or composite or resin based polymer outer sheath to achieve a bond sufficient for the purposes. Similarly a thick coating could be considered made of epoxy resin or a similar material to form the outer sheath 50A.

The aforementioned description is exemplary rather than limiting. Many modifications and variations of the present invention are possible in view of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A seatbelt retractor comprising:
a spool for seatbelt protraction and for seatbelt retraction;
an energy absorption mechanism for absorbing rotational twist energy from the spool during seatbelt protraction, the energy absorption mechanism being a torsion bar having a non-circular splined portion, a first diametral portion for a relatively high rate of rotational twist energy absorption, and a second diametral portion sized for a relatively low rate of rotational twist energy absorption, the first diametral portion being of a circular cross section having an external circumferential surface; and
an outer sheath with external threads, the outer sheath bonded, conforming to and encircling the non-circular splined portion and a portion of the external circumferential surface of the first diametral portion wherein the bond created external along the circumferential surface can withstand a torque prior to breaking higher than a torque at least the first diametral portion of the underlying torsion bar can support wherein the bond breaks along the weakest attachment location between the sheath and the circular cross section of the first diametral portion such that the rate of rotational twist energy absorption drops quickly making a rapid transition to a second lower desired rate of rotational twist energy absorption while the outer sheath and the non-circular splined portion remain bonded, intact and rotationally locked.

2. The seatbelt retractor of claim 1 wherein the torsion bar is made of steel or a steel alloy and the outer sheath is a zinc or zinc alloy material die cast onto the torsion bar.

3. A seatbelt retractor comprising:
a spool for seatbelt protraction and for seatbelt retraction;
an energy absorption mechanism for absorbing rotational twist energy from the spool during seatbelt protraction, the energy absorption mechanism being a torsion bar having a non-circular splined portion and a first diametral portion for a relatively high rate of rotational twist energy absorption and a second diametral portion for a relatively low rate of rotational twist energy absorption, the first diametral portion and the second diametral portion each having circular cross sections having external circumferential surfaces; and
an outer sheath with external threads, the outer sheath bonded, conforming to and encircling the non-circular splined portion and a circular cross section portion of each of the external circumferential surfaces of the first diametral portion and the second diametral portion wherein a bond is created at each of the external circumferential surfaces that can withstand a torque prior to breaking higher than a torque at least a portion of the underlying torsion bar can support wherein the bond breaks along the weakest attachment location between the sheath and the circular cross section of the second diametral portion such that the rate of rotational twist energy absorption drops quickly making a rapid transition to a second lower desired rate of energy absorption while the bond between the sheath and the first diametral portion remains and the outer sheath and the non-circular splined portion remain bonded, intact, and rotationally locked.

4. The seatbelt retractor of claim 3 wherein the first diametral portion and the second diametral portion are formed as a one-piece torsion bar.

5. The seatbelt retractor of claim 3 wherein the first diametral portion and second diametral portion are formed as separate pieces abutted at ends underlying the outer sheath.

6. The seatbelt retractor of claim 3 wherein the torsion bar is made of steel or a steel alloy and the outer sheath is a zinc or zinc alloy material die cast onto the torsion bar.

7. A seatbelt retractor comprising:
a spool rotatable about an axis;
a torsion bar extending along the axis and supporting the spool, the torsion bar having a non-circular splined portion and a first diametral portion of circular cross section for providing a relatively high twist force for resisting seatbelt protraction and a second diametral portion of circular cross section for providing a relatively low twist force for resisting seatbelt protraction to the spool;
a coupler for rotationally locking the spool to the movement of the torsion bar by selectively locking the first diametral portion and the second diametral portion to the rotation of the spool, the coupler having a first coupling position wherein only the first diametral portion is rotationally locked with the spool and having a second coupling position wherein the second diametral portion is rotationally locked with the spool, the coupler arranged to move between the first coupling position and the second coupling position in a direction generally along the axis;

an outer sheath interposed between the spool and the torsion bar, the outer sheath having external threads, the outer sheath bonded, conforming to and encircling the non-circular splined portion and the external circumferential surfaces of the first and second diametral portions along portions of external circumferential surfaces of the torsion bar; wherein a bond is created at each of the external circumferential surfaces that can withstand a torque prior to breaking higher than a torque the underlying torsion bar can support when the second diametral portion is rotationally locked with the spool in the second coupling position wherein the bond breaks along the weakest attachment location between the sheath and the circular cross section of the second diametral portion such that the rate of rotational twist energy absorption drops quickly making a rapid transition to a second lower desired rate of energy absorption while the bond between the sheath and the first diametral portion remains and the outer sheath and the non-circular splined portion remain bonded, intact and rotationally locked.

8. The seatbelt retractor of claim 7 including an actuator for moving the coupler between the first coupling position and the second coupling position.

9. The seatbelt retractor of claim 8 wherein the actuator comprises a gas generator.

10. The seatbelt retractor of claim 8 wherein the actuator is arranged to direct an actuation force in a direction transverse to the axis, the actuation force for moving the coupler between the first coupling position and the second coupling position.

11. The seatbelt retractor of claim 10 including a member for redirecting the actuation force from the direction transverse to the axis to the direction generally along the axis.

12. The seatbelt retractor of claim 11 including a guide structure for redirecting the member.

13. The seatbelt retractor of claim 12 wherein the guide structure comprises a ramp.

14. The seatbelt retractor of claim 7 wherein the torsion bar is made of steel or a steel alloy and the outer sheath is a zinc or zinc alloy material die cast onto the torsion bar.

15. A seatbelt retractor comprising:
a spool rotatable about an axis;
a torsion bar for absorbing rotational twist energy from the spool during seatbelt protraction, the torsion bar having non-circular splined portion and a first diametral portion of circular cross section for a relatively high rate of rotational twist energy absorption and a second diametral portion of circular cross section for a relatively low rate of rotational twist energy absorption; and
a shift mechanism for shifting between locking the first portion the second portion in rotational movement to the spool, the shift mechanism comprising a link movable between a first link position wherein the first diametral portion is rotationally locked to the spool and a second link position wherein the second diametral portion is rotationally locked to the spool, the link can be driven between the first link position and the second link position by energy from seatbelt protraction; and
a coupler for selectively coupling the rotational movement of one of the first diametral portion and the second diametral portion to the rotation of the spool, the coupler being in communication with a control unit for controlling the coupler;
an outer sheath interposed between the spool and the torsion bar, the outer sheath having external threads, the outer sheath bonded, conforming to and encircling the non-circular splined portion and external circumferential surfaces of the first and second diametral portions along portions the torsion bar having of the circular cross sections wherein a bond is created at each of the external circumferential surfaces that can withstand a torque prior to breaking higher than a torque at least a portion of the underlying torsion bar can support when the second diametral portion is rotationally locked to the spool in the second link position wherein the bond breaks along the weakest attachment location between the sheath and the circular cross section of the second diametral portion such that the rate of energy absorption drops quickly making a rapid transition to a second lower desired rate of energy absorption while the bond between the sheath and the first diametral portion remains and the outer sheath and the non-circular splined portion remain bonded, intact and rotationally locked.

16. The seatbelt retractor of claim 15 wherein the link can be driven between the first link position and the second link position by relative movement between the torsion bar and the spool.

17. The seatbelt retractor of claim 15 wherein the torsion bar is arranged to absorb rotational twist energy from the spool at the relatively high rate following the relatively low rate.

18. The seatbelt retractor of claim 17 wherein the torsion bar is arranged to absorb rotational twist energy from the spool initially at the relatively high rate, then switches to the relatively low rate through the control unit, and subsequently switches back to the relatively high rate through the shift mechanism.

19. The seatbelt retractor of claim 15 wherein the torsion bar is made of steel or a steel alloy and the outer sheath is a zinc or zinc alloy material die cast onto the torsion bar.

* * * * *